United States Patent

Griepentrog

[11] Patent Number: 5,600,381
[45] Date of Patent: Feb. 4, 1997

[54] SCAN VELOCITY MODULATION CIRCUIT

[75] Inventor: Dal F. Griepentrog, Indianapolis, Ind.

[73] Assignee: Thomsom Consumer Electronics, Inc., Indianapolis, Ind.

[21] Appl. No.: 262,431

[22] Filed: Jun. 20, 1994

[51] Int. Cl.$^6$ ...................................................... H04N 3/32
[52] U.S. Cl. ........................................... 348/626; 348/625
[58] Field of Search ..................... 348/625, 626, 348/628, 629; 315/368.21, 368.22, 371; 358/180; H04N 3/22, 3/23, 3/32

[56] References Cited

U.S. PATENT DOCUMENTS

| 3,946,152 | 3/1976 | Illetschko et al. | 348/626 |
|---|---|---|---|
| 4,185,301 | 1/1980 | Mitsuda et al. | 348/626 |
| 5,093,728 | 3/1992 | Altmanshofer | 348/626 |
| 5,164,829 | 11/1992 | Wada | 348/626 |
| 5,179,320 | 1/1993 | Tripod | 315/399 |
| 5,351,094 | 9/1994 | Washino | 348/626 |
| 5,402,044 | 3/1995 | Haferl | 315/371 |
| 5,444,500 | 8/1995 | Ten Pierick et al. | 348/807 |
| 5,486,870 | 1/1996 | Decreamer | 348/556 |

FOREIGN PATENT DOCUMENTS

| 279783 | 12/1987 | Japan | H04N 3/32 |
|---|---|---|---|
| 30276 | 1/1990 | Japan | H04N 3/32 |
| 29570 | 2/1991 | Japan | H04N 3/32 |
| 5-244449 | 9/1993 | Japan | H04N 3/32 |

OTHER PUBLICATIONS

"Scan Velocity Modulation —Making It Crisp Around The Edges!", Best of the Expander, vol. II, pp. 74–79, dated 1988.

Primary Examiner—John K. Peng
Assistant Examiner—Chris Grant
Attorney, Agent, or Firm—Joseph S. Tripoli; Joseph J. Laks; Daniel E. Sragow

[57] ABSTRACT

A television receiver includes a scan velocity modulation circuit. An amplitude correction circuit couples vertical and horizontal parabola signals to the scan velocity modulation circuit so as to vary scan velocity modulation with displacement of beam position from the center of the screen. The parabola signals may be derived from a pincushion correction circuit of the television receiver, for example, from a diode modulator. The position-indicating parabolas may control amplifier gain within the scan velocity modulation circuit, output level limiting, or the amplitude of the differentiated luminance signal applied to the amplifier to provide scan velocity modulation reduction away from screen center.

8 Claims, 3 Drawing Sheets

SCAN VELOCITY MODULATION CIRCUIT

This invention relates to adjusting beam scanning velocity to improve sharpness in a raster scanning display such as a cathode ray tube display.

The sharpness of a video display may be improved by varying the horizontal scanning rate of the beam in response to variations of the luminance component of the video signal. The luminance signal is differentiated and the differentiated luminance signal drives an auxiliary beam deflection coil to modify the horizontal scanning rate so as to emphasize contrast between light and dark areas of the display. For example, at a transition from black to whim in a given horizontal scan line, the beam scanning speed is increased approaching the transition, thus making the display relatively darker in the black area of the transition. Upon passing the transition into the white area, the beam speed is decreased such that the beam dwells relatively longer, making the display relatively brighter. The reverse occurs in passing from light to dark.

The scan velocity modulation (SVM) coil operates to add or subtract from the magnetic horizontal beam deflection field applied by the main horizontal deflection coils. The angle of beam deflection is a function of horizontal rate scanning current, generally a sawtooth current, causing the beam to sweep across a horizontal raster line at a vertical position determined by a vertical rate sawtooth current, coupled to the vertical deflection coils.

The sawtooth scanning drive currents are adjusted to account for the fact that the display screen is substantially flat rather than spherical. A given amount of angular beam deflection produces a smaller linear horizontal displacement of the beam at the center of the flat screen and a greater amount at the edges of the screen, because the screen is relatively farther from the source of the beam when scanning at the edges of the screen than at the center of the screen. The beam scan is made linear on the screen by decreasing the slope of the current sawtooth at the edges of the scan and/or increasing the slope at the center.

Where a cathode ray tube has a relatively short throw distance compared to the radius of curvature of the faceplate, and where the tube deflection angle and screen diagonal are relatively large, the electron beam tends to defocus at the edges of the screen, resulting in loss of display sharpness. Scan velocity modulation may be used in such an environment to compensate for beam defocussing at the horizontal edges of the screen by increasing the modulation near the left and right edges at a horizontal rate. However, this could cause a problem in that such an increase in scan velocity modulation may be the opposite of what is needed to correct for the flat geometry of the screen so that the scan velocity modulation effects are equal and the picture has the same sharpness, at all locations on the screen.

A given drive current in the scan velocity modulation coil produces a corresponding angular deflection of the beam in a horizontal direction. A given angular deflection produces a larger linear displacement of the beam position when scanning at the edges of the screen than at the center. Therefore, according to an inventive feature, it would be desirable to reduce rather than increase the extent of scan velocity modulation at the screen edges to correct for screen geometry effects on modulation sensitivity.

In the past, scan velocity modulation coils have not been highly sensitive. High sensitivity scan velocity modulation coils have now become available, and under some circumstance of high drive can momentarily stop the beam position during a scan, or if overdriven can even move the scanning beam backwards, thereby detracting from sharpness. It would be advantageous if a scan velocity modulation signal could be made to more accurately follow sensitivity variations during raster scanning to take full advantage of these high sensitivity coils.

In an inventive arrangement, a scan velocity modulation circuit includes a drive signal generator for a deflection device which produces modulated deflection of an electron beam in a picture tube in response to a video signal. A source of a deflection rate input signal modifies the drive signal to vary the amount of modulated deflection as a function of screen beam position.

Figure 1:
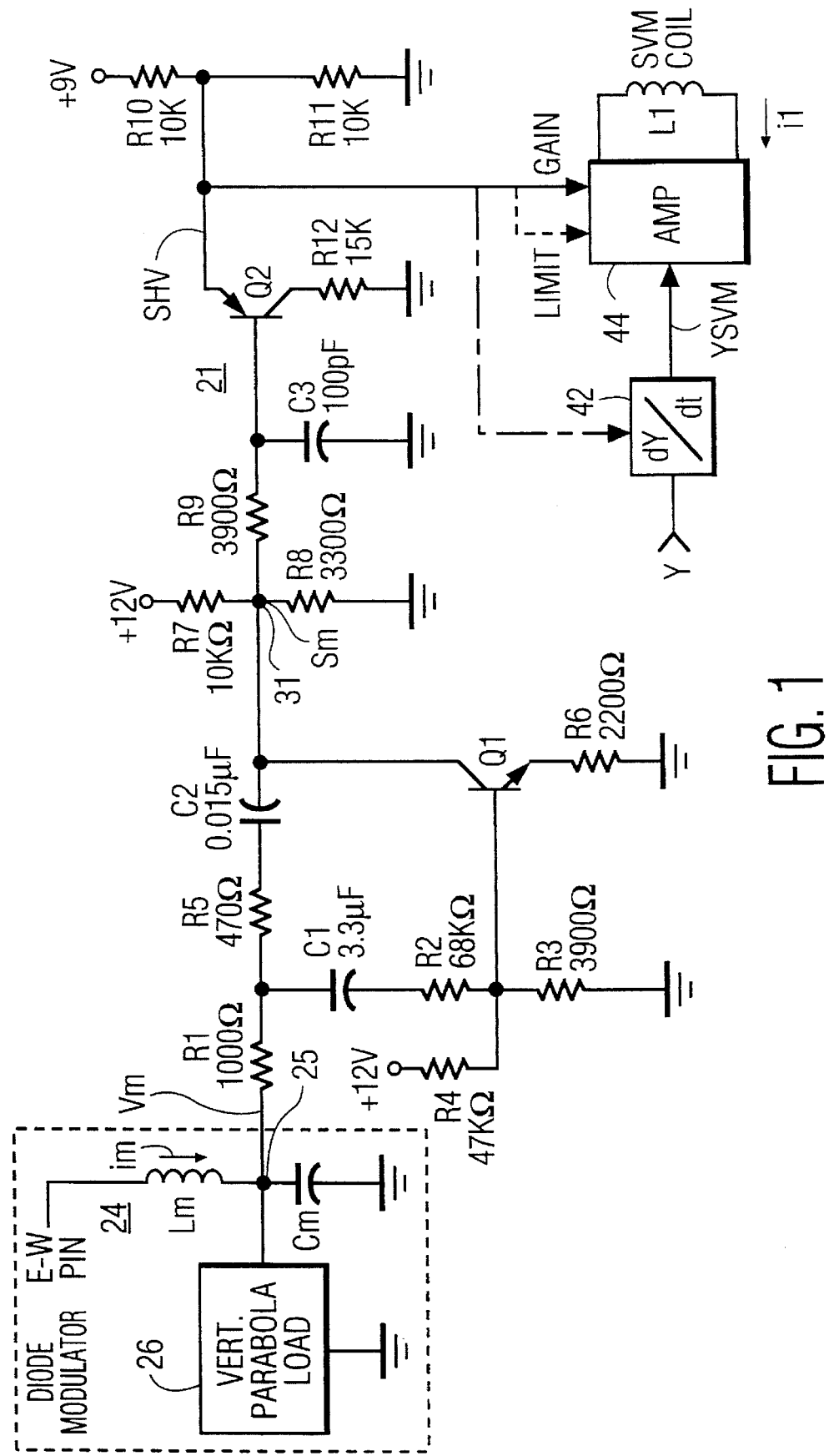
FIG. 1 is a schematic diagram illustrating an exemplary embodiment of an inventive scan velocity modulation circuit.

For improving sharpness of a scanning beam display, for example of a television receiver, video terminal or the like, a luminance signal Y is coupled to a scan velocity modulation circuit of FIG. 1, for altering the beam scanning rate. The luminarice signal Y is coupled to a differentiator stage 42 that develops a scan velocity modulation signal YSVM that is coupled to an amplifier 44 for driving a scan velocity modulation (SVM) device L1, for example, an auxiliary deflection coil mounted on the cathode ray tube for adding to or subtracting from the horizontal deflection field produced by the main deflection coils (not shown) while raster scanning. Alternatively, auxiliary electrostatic deflection plates may be used.

The derivative dY/dt of luminance signal Y represents the extent to which the luminance signal is in transition from light to dark or dark to light. Picture sharpness is improved by causing the beam to pass more slowly than nominal, on the lighter side of a luminance transition, and to pass more quickly than nominal on the darker side of the transition.

Figure 2:
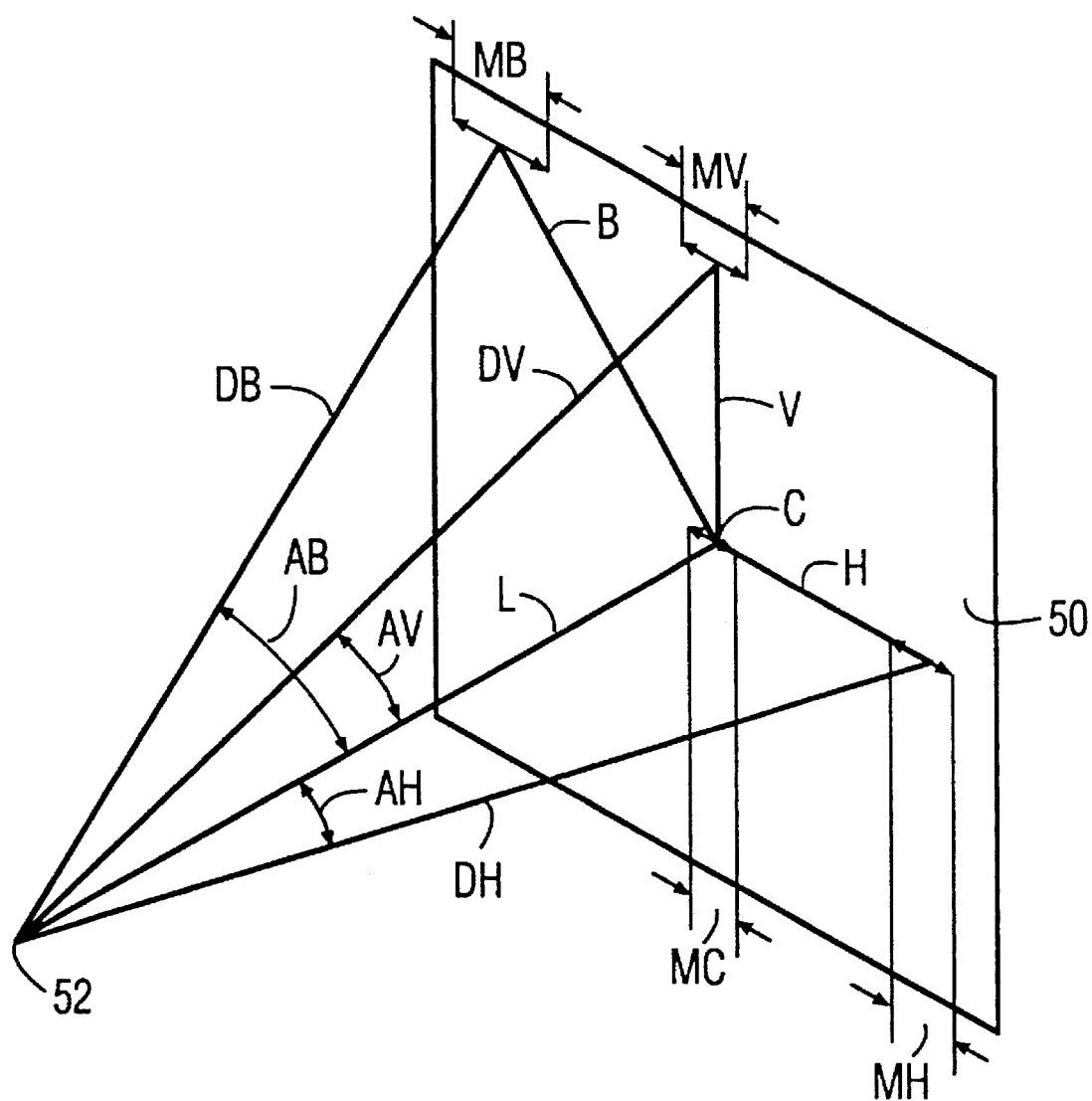
FIG. 2 is an isometric view showing the geometry of beam scanning over a substantially flat screen.

As shown in exaggerated manner in FIG. 2, the display screen 50 of a picture tube is substantially flatter than a spherical surface, such that the distance between the deflection center 52 of the beam, and the surface of the screen bearing the phosphors, varies as a function of the position of the beam on the screen. Thus, the shortest distance or throw distance L between deflection center 52 and screen 50 is at screen center C, along the center line or tube longitudinal axis. A beam length DH or DV when scanning at the horizontal or vertical edge, at a linear screen distance H or V from the center, is related to the cosine of an angle AH or AV, respectively, between center line L and the beam lines DH or DV. The greatest beam length DB occurs at the screen corners, at a distance B from the center, because angle AB is at the greatest angular deflection from center line L.

As a result of this geometry, a given difference in angular deflection of the beam, for example due to a difference in deflection driving current, has different effects with respect to linear displacement of the beam on screen 50 at different points of the screen. A given increment of driving current produces a proportional angular deflection of the beam, regardless of beam position. However, this angular deflection produces a different linear displacement of the beam on the screen, as a function of beam position. The linear displacement MC for an increment of driving current is smallest at the center, greater for displacements MH and MV, at respective horizontal and vertical screen edges, and is greatest for displacement MB, at an extreme corner of display 50.

If the scan velocity modulation circuit responds only to the differential of the luminance signal, linear beam speed would be slower at the center of the screen, where a given angular deflection produces a relatively smaller linear displacement of the beam, than at the edges, where the same angular deflection of the beam produces a greater linear displacement on the screen as shown. Thus, the sharpness of the picture would undesirably vary from the center of the screen outwardly.

According to an inventive feature of the scan velocity modulation circuit of FIG. 1, a beam position dependent scan velocity modulation is provided, by varying the output of the scan velocity modulation circuit as a function of beam position displacement from center. This is accomplished by varying the scan velocity modulation drive at horizontal and/or vertical rates. The amplitude of scan velocity modulation is reduced when scanning remote from the center of the display as a function of the beam displacement from the center, thereby providing sharpness enhancement that is substantially independent of beam position.

The amplitude of scan velocity modulation may be controlled in various ways, e.g. by varying a gain element in the scan velocity modulation circuit such as amplifier 44 in FIG. 1, by varying the input signal level, or by dynamically limiting an output level of the scan velocity modulation circuit. In FIG. 1, for example, a combined horizontal and vertical rate parabola correction signal, SHV, developed at the emitter of a buffer transistor Q2, may be coupled to a gain control input of amplifier 44 to modify the amplitude of SVM current i1 in SVM coil L1 so as to decrease deflection drive at the screen edges. Alternatively, as shown by the dashed line, signal SHV may be coupled to the limit input of amplifier 44. As a third alternative, as shown by the dash-dot line in FIG. 1, correction signal SHV may be applied to differentiator stage 42 to control, using conventional techniques, the amplitude of modulation signal YSVM.

One factor in determining the extent of the variation of scan velocity modulation from center to edge is the aspect ratio as well as the geometry of the screen. For example, a maximum 50 percent reduction in scan velocity modulation for horizontal displacement from center, and a maximum 20 percent reduction for vertical displacement from center, may be required in a 35 V, 4×3 aspect ratio, flat display screen, to render the sensitivity of scan velocity modulation, i.e. S=Δs/Δi1, substantially the same at all beam positions, where As represents a small linear deflection and Δi1 of a small change in modulation coil current.

The difference in maximum scan velocity reduction between vertical and horizontal positions is required because the display has a relatively greater width than height. Other specific percentages may apply, for example, when taking into account picture tubes of different longitudinal depths and screen curvatures and SVM coils of different deflection sensitivities.

In FIG. 1, an east-west pincushion correction circuit 24 of the television receiver, which produces parabolas at the horizontal and vertical scanning rates, is advantageously used to generate scan velocity modulation correction signal SHV. Other voltages at circuit locations may be advantageously used, such as the voltage across the S-shaping capacitor of a horizontal deflection circuit, not shown, where the horizontal deflection current undergoes amplitude changes for east-west pincushion correction.

East-west pincushion circuit 24 may be of the diode modulator type, where a horizontal rate sawtooth current im flows in a modulator inductor Lm coupled in series with a modulator capacitor Cm at a junction 25. Current im is integrated by capacitor Cm to produce a horizontal rate, fH, parabolically shaped modulator voltage Vm, as illustrated in the horizontal rate time scale of FIG. 3a. An additional circuit 26, in shunt with capacitor Cm, loads junction 25 at a vertical rate in a parabolic manner, to modulate voltage Vm at a vertical rate, 1/fV, in a parabolic manner, as illustrated in the vertical rate time scale of FIG. 3b. As a specific example, the vertical parabola voltage Vm is 20 volts peak-to-peak and the horizontal parabola modulation depth is 3 to 4 volts.

Figure 3A:
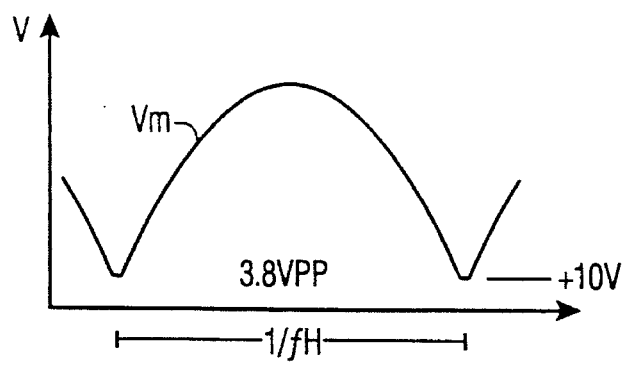
FIGS. 3a, 3b, 4a and 4b are timing diagrams showing modulating parabolas applied to control scan velocity modulation.

Pincushion modulator voltage Vm is applied as an input signal to an SVM amplitude correction circuit 21 of FIG. 1. The horizontal parabola component of voltage Vm is coupled to a summing junction 31 of voltage dividing resistors R7 and R8 via the series path of a resistor R1, a resistor R5 and a capacitor C2. The vertical parabola component of voltage Vm is blocked by the relatively small value of capacitor C2. The values of these five components result in the desired amplitude of horizontal parabola correction and advantageously provide slight differentiation to obtain a parabola waveform having its peak centered within the horizontal trace interval. As indicated in FIG. 3a, the horizontal parabola component of east-west modulator voltage Vm is maximum at screen center, the same requirement that is needed for SVM amplitude correction. Thus, the signal path to summing junction 31 for the horizontal parabola component is a non-inverting path.

Figure 3B:
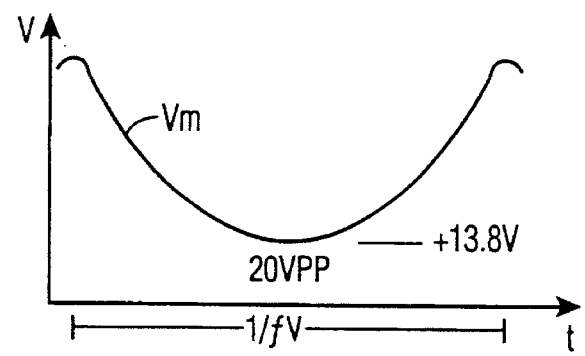

The vertical parabola component of voltage Vm, as indicated in FIG. 3b, is minimum at screen center and thus requires inversion before being combined with the horizontal parabola component at summing junction 31. To provide this inversion, voltage Vm is taken off at the junction of resistors R1 and R5 and is applied to the base of an inverting transistor Q1 via a series arrangement of a DC blocking capacitor C1 and a resistor R2. DC biasing of the base of transistor Q1 is provided at the junction of voltage dividing resistors R4 and R3. Emitter degeneration for transistor Q1 is provided by a resistor R6. The vertical parabola component of voltage Vm is adjusted in amplitude by operation of components R2, R3, R4, and R6, inverted in polarity at the collector of transistor Q1 and summed with the horizontal parabola at summing node 31 to provide the combined SVM amplitude correction signal Sm. The separate paths taken by horizontal parabola component and the vertical parabola component of voltage Vm advantageously enable the independent control of each of the parabola amplitudes. The small amount of horizontal parabola component inverted by transistor Q1 subtracts insignificantly from the required positive polarity horizontal parabola voltage needed at summing point 31.

Amplitude correction signal Sm is applied to the base of an emitter follower buffer transistor Q2 via a resistor R9. A high frequency noise pickup capacitor C3 bypasses the base. The SVM amplitude correction signal SHV thus developed, and previously discussed, is then applied as a gain or limit adjusting signal to SVM amplifier 44 or is then applied as an amplitude control signal to differentiator stage 42. DC biasing of the emitter of transistor Q2 is provided at the junction of voltage dividing resistors R10 and R11.

A resistor R12, serves as a collector load resistor for transistor Q2 and provides for earlier saturation near the most negative excursions of the parabola components of signal SM. The resulting reduction in drive by correction signal SHV at the screen edges advantageously produces a better fit of correction signal drive to screen geometry.

Figure 4A:
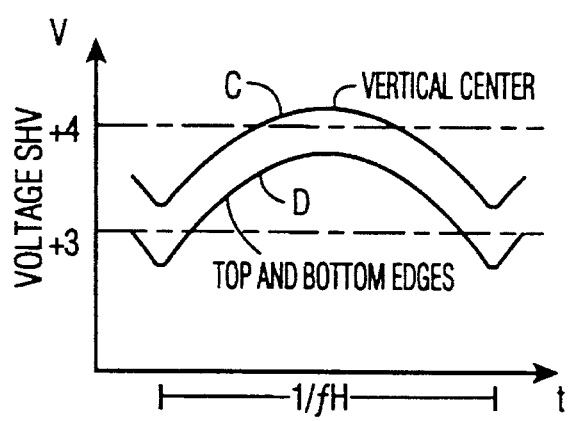
Figure 4B:
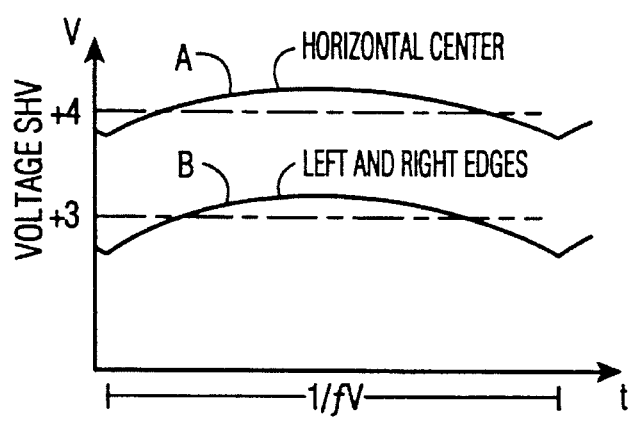

As shown at the vertical rate time scale of FIG. 4b, correction voltage SHV is a positive-going parabola, with the horizontal rate modulation being indicated by the envelope A–B, which defines the modulation depth of the waveform. As shown in the horizontal rate time scale of FIG. 4a, the horizontal component of correction voltage SHV is also a positive-going parabola, with the vertical rate modulation being indicated by the envelope C–D, which defines the modulation depth of the waveform. In this way, SVM amplitude correction circuit 21 provides independently adjustable horizontal and vertical rate parabola signals combined in their proper polarities.

What is claimed is:

1. A scan velocity modulation circuit, comprising:

a source of a video signal;

means for deflecting an electron beam of a picture tube;

means responsive to said video signal and coupled to said deflecting means for generating a drive signal which produces scan velocity modulated deflection of said electron beam;

a source of an input signal having vertical and horizontal rate components; and means coupled to said input signal source and to said drive signal generating means for producing a correction signal having vertical and horizontal rate components differing in relative amplitudes from that of said input signal, said drive signal being modified in accordance with the vertical and horizontal rate components of said correction signal.

2. A circuit according to claim 1, wherein said input signal source comprises a capacitance coupled to an inductance, a horizontal rate sawtooth current flowing in said inductance producing said horizontal rate component as a generally parabolic waveform, an additional circuit coupled to said capacitance producing said vertical rate component as another generally parabolic waveform.

3. A circuit according to claim 2, wherein said input signal source comprises an east-west pincushion correction circuit.

4. A circuit according to claim 2, wherein said correction signal producing means includes means for centering said horizontal rate parabolic waveform within a horizontal trace interval.

5. A circuit according to claim 1, wherein said drive signal is modified to reduce said electron beam deflection modulation near top, bottom, left and right screen edges of said picture tube relative to screen center.

6. A scan velocity modulation circuit comprising:

a source of a video signal;

means for deflecting an electron beam of a picture tube;

means responsive to said video signal and coupled to said deflecting means for generating a drive signal which produces an amount of scan velocity modulated deflection of said electron beam;

a source of a deflection rate input signal;

means responsive to said deflection rate input signal for modifying said drive signal to reduce the amount of modulated deflection of said electron beam near a screen edge of said picture tube relative to a screen center;

wherein said deflection rate input signal includes horizontal and vertical rate parabola components; and wherein said modifying means includes means for separating said horizontal and vertical rate parabola components into first and second paths respectively to change the relative amplitudes of the two parabola components, said two parabola components thereafter being recombined to produce a correction signal that is applied to said drive signal generating means for modifying said drive signal in accordance with said correction signal.

7. A circuit according to claim 6, wherein said separating means includes means for inverting the polarity of one of the two parabola components relative to the other one prior to being recombined.

8. A circuit according to claim 6, wherein said separating means comprises means for waveshaping one of the parabola components to center its peak within a deflection trace interval.

* * * * *